United States Patent
Breau et al.

(10) Patent No.: US 8,667,564 B1
(45) Date of Patent: Mar. 4, 2014

(54) MOBILE INTERNET PROTOCOL V6 SIP PROXY BOOTSTRAPPING

(75) Inventors: Jeremy R. Breau, Kansas City, MO (US); Kent Delancy Mabee, San Diego, CA (US); Randall Allen Smischny, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1288 days.

(21) Appl. No.: 12/236,750

(22) Filed: Sep. 24, 2008

(51) Int. Cl.
*H04L 29/06* (2006.01)
*G06F 7/02* (2006.01)

(52) U.S. Cl.
CPC ....... *H04L 65/1006* (2013.01); *H04L 29/06197* (2013.01); *H04L 63/08* (2013.01)
USPC ........ 726/3; 726/2; 726/5; 713/169; 709/223; 709/227; 709/228

(58) Field of Classification Search
CPC .................................................. H04L 65/1006
See application file for complete search history.

(56) References Cited

U.S. PATENT DOCUMENTS

| 2006/0120340 | A1* | 6/2006 | Mizukoshi | 370/338 |
| 2006/0291472 | A1* | 12/2006 | Guo et al. | 370/395.5 |
| 2007/0213053 | A1* | 9/2007 | Do | 455/435.1 |
| 2008/0159194 | A1* | 7/2008 | Westman et al. | 370/310 |

OTHER PUBLICATIONS

Bournelle, J.; Laurent-Maknavicius, M.; Giaretta, G.; Guardini, I.; Demaria, E.; Marchetti, L.; , "Bootstrapping mobile IPv6 using EAP," Networks, 2005. Jointly held with the 2005 IEEE 7th Malaysia International Conference on Communication., 2005 13th IEEE International Conference on , vol. 2, no., pp. 6 pp., Nov. 16-18, 2005.*

Bournelle, J.; Laurent-Maknavicius, M.; Giaretta, G.; Guardini, I.; Demaria, E.; Marchetti, L.;, "Bootstrapping mobile IPv6 using EAP," Networks, 2005. Jointly held with the 2005 IEEE 7th Malaysia International Conference on Communication., 2005 13th IEEE International Conference on, vol. 2, no., pp. 6 pp., Nov. 16-18, 2005.*

Kuntal Chowdhury; Chart: MIP6-bootstrapping via DHCPv6 for the Integrated Scenario, 15 pp.

Julien Bournelle et al., "Bootstrapping Mobile IPv6 using EAP," 6 pp.

* cited by examiner

*Primary Examiner* — Ashok Patel
*Assistant Examiner* — Alexander Lagor

(57) ABSTRACT

A method, system, and device are provided for bootstrapping a Session Initiation Protocol Proxy for a mobile device when the Home Agent is bootstrapped for the device. When an authentication server obtains a Home Agent address for the mobile device, it also obtains a Session Initiation Protocol Proxy address, associated with the Home Agent, for the mobile device. The Session Initiation Protocol Proxy address is sent to the mobile device along with the Home Agent address.

12 Claims, 5 Drawing Sheets

MOBILE INTERNET PROTOCOL V6 SIP PROXY BOOTSTRAPPING

BACKGROUND

Embodiments of the present invention generally relate to communication by a mobile device over an Internet Protocol network.

SUMMARY

Embodiments of the invention are defined by the claims below, not this summary. A high-level overview of embodiments of the invention are provided here for that reason, to provide an overview of the disclosure.

In a first aspect, an exemplary system is provided for dynamically configuring a Session Initiation Protocol Proxy address for a mobile device. The mobile device sends an authentication request and a bootstrap request to a gateway. The gateway sends the authentication request to an authentication provider. The authentication provider authenticates the mobile device and obtains a Home Agent address for the mobile device. The authentication provider also obtains a Session Initiation Protocol Proxy address associated with the Home Agent address. The authentication provider sends the Home Agent address and the Session Initiation Protocol Proxy address to the gateway. When the gateway receives the bootstrap request from the mobile device, it sends the Home Agent address and the Session Initiation Protocol Proxy address to the mobile device. Thus, the Session Initiation Protocol Proxy is dynamically assigned to the mobile device.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
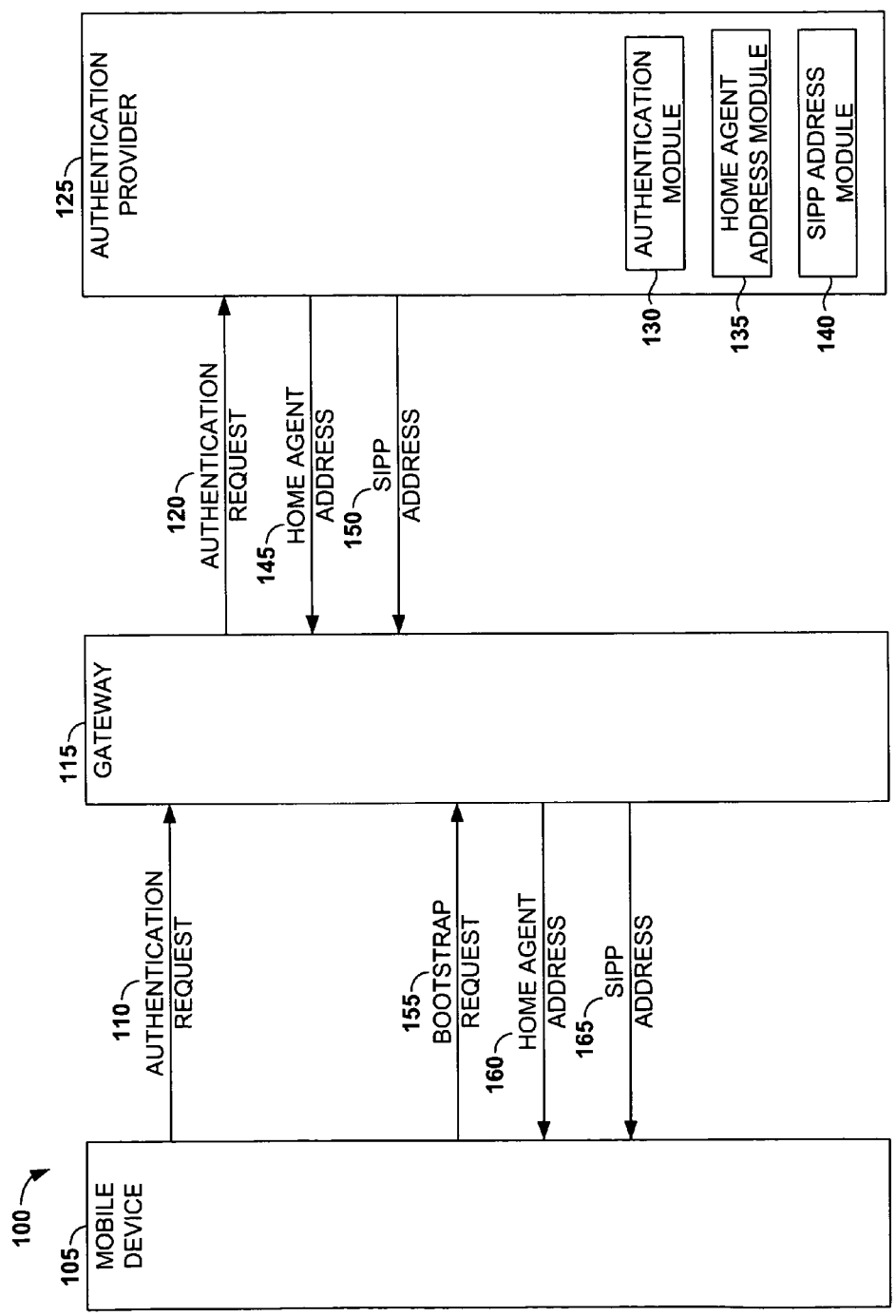
FIG. 1 depicts a system for dynamically configuring a Session Initiation Protocol Proxy address for a mobile device in accordance with an embodiment of the present invention.

Embodiments of the present invention provide systems and methods for dynamically assigning a Session Initiation Protocol Proxy to a mobile device when the Home Agent is assigned to the device, with the mobile device communicating over an Internet Protocol (IP) network, performing Mobile IP using the Internet Protocol version 6 (IPv6) protocol. A description of IPv6 and Mobile IP may be found in specifications RFC 1752 and RFC 3775, respectively, by the Internet Engineering Task Force (IETF), which are incorporated herein by reference.

Throughout the description of the present invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

AAA Authentication, Authorization and Accounting
    CD-ROM Compact Disc read-only memory
    DVD Digital Versatile Disc
    EEPROM Electrically Erasable Programmable Read-Only Memory
    IP Internet Protocol
    IPv6 Internet Protocol version 6
    PDSN Packet Data Serving Node
    RADIUS Remote Authentication Dial In User Service
    RAM Random Access Memory
    ROM Read Only Memory
    SIP Session Initiation Protocol
    SIPP Session Initiation Protocol Proxy
    VOIP Voice Over IP Further, various technical terms are used throughout this description. An illustrative resource that fleshes out various aspects of these terms can be found in *Newton's Telecom Dictionary* by H. Newton, 24$^{th}$ Edition (2008).

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention may relate to Mobile IPv6, which is a version of Internet Protocol version 6 (IPv6). IPv6 is a standard defining how devices may communicate over a packet switched network. Mobile IPv6 allows a node to maintain a connection over a network while being mobile. When the mobile node connects to a network, a Home Agent is assigned, or bootstrapped to it, during the authentication process. The node then establishes a connection with its Home Agent. Embodiments of the present invention provide bootstrapping, or dynamic assignment, of a Session Initiation Protocol (SIP) Proxy for a mobile node when a Home Agent is assigned to the mobile node. SIP is a protocol used with multimedia communication sessions. A SIP Proxy is a server that handles SIP communications and routes SIP messages to appropriate destinations. In order for a mobile node to access SIP applications and communications, it must know the IP address of a SIP Proxy to which it can direct SIP messages. The SIP Proxy is also used to allow the mobile node to communicate across different networks or communicate across networks with firewalls.

In embodiments of the present invention, providing the mobile node with a SIP Proxy associated with the mobile node's Home Agent enables more efficient communications when using SIP applications such as Voice over Internet Protocol (VOIP), instant messaging, and streaming multimedia services. A SIP Proxy that is adjacent to the Home Agent may provide a more efficient communication path between the Home Agent and the SIP Proxy. Adjacency between the SIP Proxy and the Home Agent may be based on an architectural, topological, or geographical relationship within the network The process of assigning a Home Agent and a SIP Proxy to a mobile node may occur either within the mobile node's home network or a foreign network. A home network is the network in which the mobile node has its permanent IP address. A foreign network is any network other than the home network.

In FIG. 1, an exemplary system is depicted which may be used in implementing embodiments of the present invention and is generally referred to as a system 100. The system 100 is but one example of a suitable system and is not intended to suggest any limitation as to the scope of use or functionality. Neither should the system 100 be interpreted as having any dependency or requirement relating to any one or combination of components or modules illustrated.

When a mobile device 105 attempts to establish a communication session over a network, it sends an authentication request 110 to a gateway 115. The gateway 115 sends the authentication request 120 to the authentication provider 125. The authentication provider 125 authenticates the mobile device using the authentication module 130. The authentication module 130 authenticates the identity of a device attempting to connect to the network based on credentials that are presented to the authentication module 130 by the device. The authentication module 130 also grants specific privileges to the device, such as the types of services it may be allowed to access, and tracks accounting information such as the identity of the device, network resources used, and duration of use. An exemplary authentication module 130 is a Remote Authentication Dial In User Service (RADIUS) protocol. The authentication module 130 may reside in a server or other computing device known to one skilled in the art and may comprise software instructions stored in a memory device and carried out by the computing device.

The authentication provider 125 obtains a Home Agent address, using a Home Agent address module 135. The Home Agent address module 135 may reside in a server or other computing device known to one skilled in the art and may comprise software instructions stored in a memory device and carried out by the computing device. The Home Agent address module 135 may communicate with an internal or external database containing addresses of Home Agents that have been assigned to mobile devices in the mobile devices' home networks. Home Agents may be assigned to mobile devices based on the location of the mobile device to provide the most efficient communication path.

The authentication provider 125 obtains a Session Initiation Protocol (SIP) Proxy address associated with the received Home Agent address, using a SIP Proxy address module 140. The SIP Proxy address module 140 may reside in a server or other computing device known to one skilled in the art and may comprise software instructions stored in a memory device and carried out by the computing device. The Home Agent address module 135 may comprise the SIP Proxy address module 140. The SIP Proxy address may be received in one embodiment as a result of a database query of a preconfigured list of SIP Proxy servers that have been assigned to Home Agents. In an embodiment of the present invention, the associations between SIP Proxies and Home Agents are statically assigned and may represent the most efficient communication path.

The authentication provider 125 sends the Home Agent address 145 and the SIP Proxy address 150 to the gateway 115. The gateway 115 stores the Home Agent address 145 and the SIP Proxy address 150 in anticipation of a bootstrap request 155 from the mobile device 105. Once the gateway 115 receives the bootstrap request 155 from the mobile device 105, it sends the Home Agent address 160 and the SIP Proxy address 165 to the mobile device 105. The mobile device 105 uses the Home Agent Address 160 to communicate with the Home Agent and establish a communication session. Using the SIP Proxy address, the mobile device 105 can access VOIP services, instant messaging, streaming multimedia services, and other types of multimedia communications.

Figure 2:
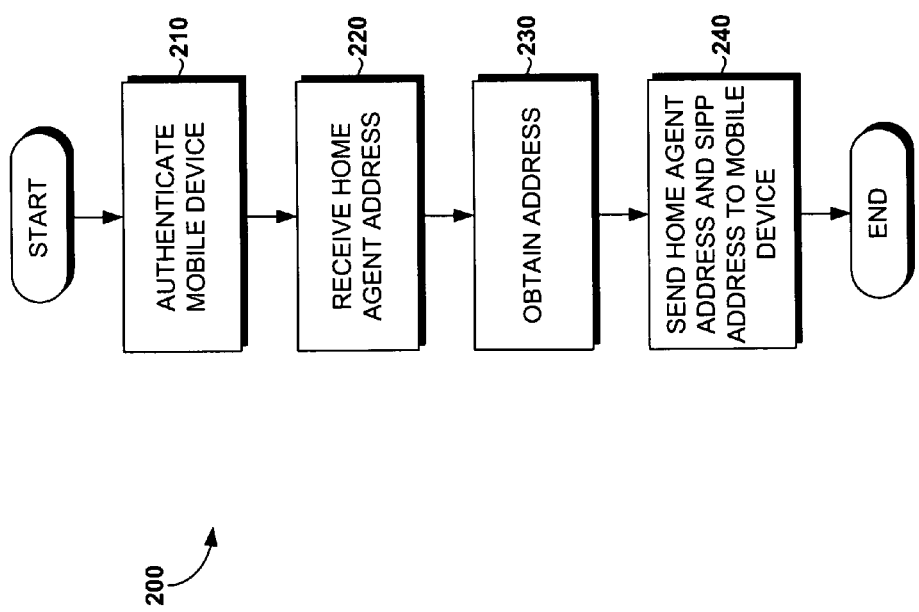
FIG. 2 depicts a flowchart for enabling a mobile device to communicate across one or more networks in accordance with an embodiment of the present invention.

In FIG. 2, an exemplary process is depicted which may be used in implementing embodiments of the present invention and is generally referred to as a process 200. The process 200 is but one example of a suitable process and is not intended to suggest any limitation as to the scope of use or functionality. Neither should the process 200 be interpreted as having any dependency or requirement relating to any one or combination of components or modules illustrated.

In an embodiment of the present invention, when a mobile device attempts to connect to a network, it is challenged to authenticate itself. The mobile device sends its credentials to an Internet Protocol (IP) gateway. An exemplary IP gateway is a Packet Data Serving Node (PDSN). A PDSN is used to provide access to a network for a mobile device. The gateway sends the credentials to an authentication server. An exemplary authentication server is a RADIUS server. The authentication server may also be referred to as an Authentication, Authorization and Accounting (AAA) system.

The authentication server authenticates the credentials of the mobile device at a step 210. The AAA system receives from a database query the appropriate Home Agent address for the mobile device, at a step 220. The Home Agent address represents the Home Agent chosen to be used by the mobile device, and includes the Home Agent subnet prefix. In an embodiment of the present invention, the Home Agent is chosen to provide the optimum communication path between the mobile device and the Home Agent. This may be based on at least an architectural, topological, or geographical relationship between the location of the mobile device and the location of the Home Agent. Additionally, in an embodiment of the present invention, the AAA system obtains a SIP Proxy address from the database at a step 230. The SIP Proxy address represents the SIP Proxy chosen to be the most appropriate SIP Proxy to use with that particular Home Agent, based on the location of the Home Agent, to optimize the communication path between the SIP Proxy server and the Home Agent.

When the AAA system sends a message to the gateway, indicating that the mobile device has been authenticated, it includes the Home Agent address, the Home Agent subnet prefix, and the SIP Proxy address as attribute value pairs. When the gateway receives the message, it stores the attribute value pairs for the purpose of bootstrapping the mobile device.

The mobile device continues to establish a session until it has completely established its service connection. At that point, it sends a bootstrap request to the gateway. The gateway responds to the bootstrap request and forwards the attribute value pairs to the mobile device at a step 240. At this point, the mobile device knows the Home Agent, the Home Address subnet prefix, and the SIP Proxy. Using that information, the mobile device communicates according to the Mobile IPv6 protocol. It also populates the SIP Proxy address into its SIP applications so, when the applications send a SIP message, the destination IP is set automatically to the SIP Proxy that was received.

With continued reference to FIG. 2, in an embodiment of the present invention, the gateway and the authentication server may together make up an authentication system, with the gateway functioning as an authentication client in relation to the authentication server. Receiving the Home Agent address may be performed by the authentication client (gateway), rather than the authentication server. Likewise, obtaining the SIP Proxy address may be performed by the authentication client.

Figure 3:
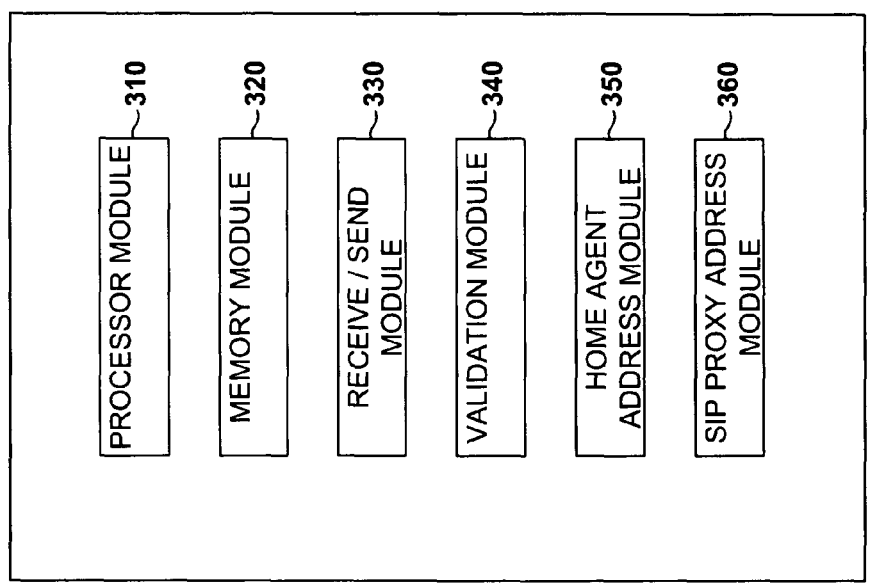
FIG. 3 depicts a block diagram of a device for bootstrapping a Session Initiation Protocol Proxy to a mobile node in accordance with an embodiment of the present invention.

In FIG. 3, an exemplary computing device is depicted which may be used in implementing embodiments of the present invention and is generally referred to as a computing device 300. The computing device 300 is but one example of a suitable computing device and is not intended to suggest any limitation as to the scope of use or functionality. Neither should the computing device 300 be interpreted as having any dependency or requirement relating to any one or combination of components or modules illustrated.

In an embodiment of the present invention, the computing device 300 has a processor module 310 coupled to a memory module 320. The processor module 310 may be a microprocessor, a microcontroller, a central processing unit, or other type of processing device that carries out the instructions of a software program stored in the memory module 320. The memory module 320 may be ROM, RAM, EEPROM, a hard drive, or other device for storing computer instructions and data.

The computing device 300 may be an authentication server. An exemplary authentication server is a RADIUS server. In an embodiment of the present invention, a mobile node desiring to establish a communication session over a network sends a request and its authentication credentials to an IP gateway. An exemplary IP gateway is a PDSN. The IP gateway sends the authentication credentials to the computing device 300, which receives the authentication credentials using the receive/send module 330. The receive/send module 330 enables the computing device 300 to communicate with other network elements. The receive/send module 330 may comprise software instructions carried out by processor module 310 and a hardware communication interface that transmits and receives signals over the network.

The computing device 300 may access a local or external database, or other source, to validate the authentication credentials of the mobile device, using the validation module 340. The validation module 340 validates, or authenticates, the identity of a mobile node attempting to connect to the network. The validation module 340 may comprise software instructions stored in the memory module 320 and carried out by processor module 310.

The computing device 300 also obtains a Home Agent address, from a local or external database or other source, for the mobile node using Home Agent address module 350. The Home Agent address module 350 may comprise software instructions stored in memory module 320 and carried out by processor module 310. The Home Agent address module 350 may query a database to access a list of Home Agents that are assigned to mobile nodes in the mobile nodes' home networks. The Home Agent address is used by the mobile node to establish a communication session between the Home Agent and the mobile node. In an embodiment of the present invention, the Home Agent address represents the Home Agent having an optimal communication path with the mobile device. This may be based on a location within the network, such as an architectural, topological, or geographical location.

Additionally, from a local or external database or other source, the computing device 300 obtains a SIP Proxy address of a SIP Proxy for the mobile device, using SIP Proxy address module 360. The SIP Proxy address module 360 may reside in a server or other computing device known to one skilled in the art and may comprise software instructions stored in a memory device and carried out by the computing device. The SIP Proxy address module 360 may query the database or other source to access a list of SIP Proxy addresses that are assigned to Home Agents. The SIP Proxy address is used by the mobile node in order to support SIP applications that communicate via SIP. Examples of SIP applications can include VOIP, video conferencing, streaming multimedia distribution, and instant messaging. In an embodiment of the present invention, the SIP Proxy address may be associated with the Home Agent address. An exemplary association may be such that it represents the SIP Proxy server having an optimal communication path with the Home Agent. This may be the SIP Proxy server nearest the Home Agent.

Using the receive/send module 320, the computing device 300 sends a message to the IP gateway indicating that the mobile node is granted access to the network. Included with that message are the address of the SIP Proxy and the Home Agent address. When the IP gateway receives a bootstrapping request from the mobile node, it sends the Home Agent address and SIP Proxy address to the mobile node. With that information, the mobile node is able to communicate with its Home Agent to establish a communication session, and also has the SIP proxy address for use by SIP applications.

Figure 4:
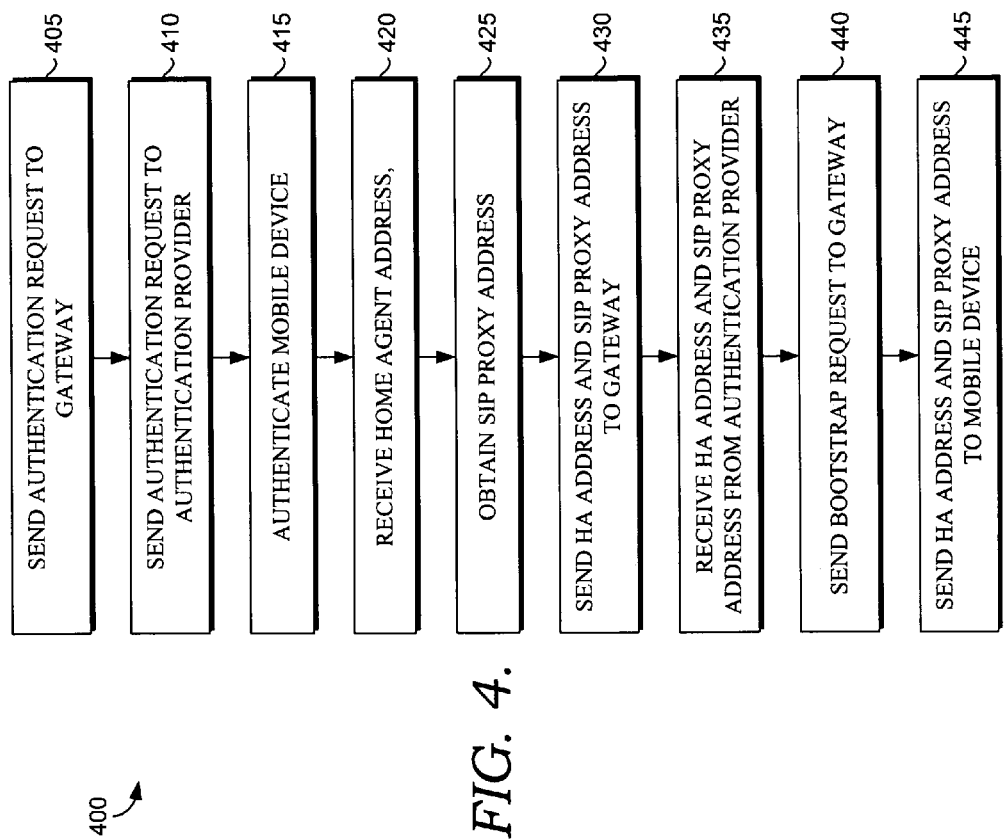
FIG. 4 depicts a flowchart for dynamically configuring a Session Initiation Protocol Proxy address for a mobile device in accordance with an embodiment of the present invention.

In FIG. 4, an exemplary process is depicted which may be used in implementing dynamic configuration of a Session Initiation Protocol Proxy address for a mobile device in accordance with an embodiment of the present invention, and is generally referred to as a process 400. The process 400 is but one example of a suitable process and is not intended to suggest any limitation as to scope of use or functionality. Neither should the process 400 be interpreted as having any dependency or requirement relating to any one or combination of components or modules illustrated.

At a step 405, the mobile device sends an authentication request to an IP gateway as part of the process of establishing a connection to a network. An exemplary network runs IPv6 which provides for the operation of mobile IP. At a step 410, the IP gateway sends the authentication request to an authentication provider. An exemplary authentication provider is an AAA server. The authentication provider authenticates the mobile device at a step 415, and receives a Home Agent address for the mobile device at a step 420. The Home Agent is a router in the home network of the mobile device that communicates with the mobile device when it is away from its home network. In embodiments of the present invention, the Home Agent address may be received from an external database in response to a query by the authentication provider, it may be stored internally to the authentication provider, or it may be received from some other source.

When the authentication provider receives the Home Agent address, it also obtains a SIP Proxy address at a step 425. In embodiments of the present invention, the SIP Proxy address may identify a SIP Proxy associated with the Home Agent. In embodiments of the present invention, the SIP Proxy address may be received from an external database in response to a query by the authentication provider, it may be received from internal memory of the authentication provider, or it may be received from some other source.

Once the authentication provider has the Home Agent address and the SIP Proxy address, it sends them to the IP gateway at a step 430. When the IP gateway receives the Home Agent address and the SIP Proxy address, at a step 435, it stores them in anticipation of a bootstrap request sent by the mobile device at a step 440. Once the bootstrap request is received by the IP gateway, it responds by sending the Home Agent address and the SIP Proxy address to the mobile device, at a step 445. This enables the mobile device to communicate with its Home Agent and the SIP Proxy.

Figure 5:
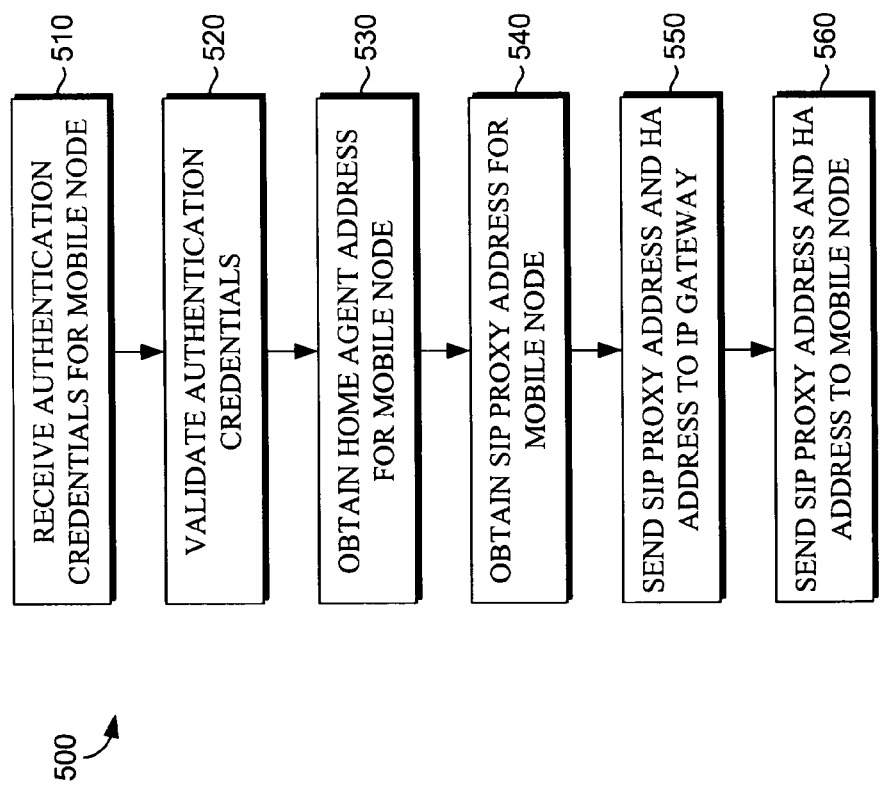
FIG. 5 depicts a flowchart for enabling a computing device to bootstrap a Session Initiation Protocol Proxy to a mobile node in accordance with an embodiment of the present invention.

In FIG. 5, an exemplary process is depicted which may be used for enabling a computing device to bootstrap a Session Initiation Protocol Proxy to a mobile node in accordance with an embodiment of the present invention, and is generally referred to as a process 500. The process 500 is but one example of a suitable process and is not intended to suggest any limitation as to scope of use or functionality. Neither should the process 500 be interpreted as having any dependency or requirement relating to any one or combination of components or modules illustrated.

At a step 510, the computing device receives, from an IP gateway, authentication credentials for a mobile node attempting to connect to the network. In embodiments of the present invention, the computing device may be an authentication server, one example of which is an AAA server. Another exemplary computing device is computing device 300, depicted in FIG. 3. The authentication credentials are validated by the computing device at a step 520. The computing device obtains a Home Agent address for the mobile node at a step 530. When a mobile node is away from home, it requires a router in its home network, known as a Home Agent, in order to communicate over the network. The Home Agent address may be obtained from a database internal to the computing device, external to the computing device, or by other means known to one of ordinary skill in the art.

At a step 540, the computing device obtains the SIP Proxy for the mobile node. In embodiments of the present invention, the SIP Proxy may be associated with the Home Agent address, the association having been previously made. The association may be based on the most efficient communication path between the SIP Proxy and the Home Agent. The SIP Proxy may be obtained from a database internal to the computing device, external to the computing device, or by other means known to one of ordinary skill in the art.

The computing device sends the SIP Proxy address and the Home Agent address to the IP gateway at a step 550. When the IP gateway receives a bootstrap request from the mobile node, it sends the Session Initiation Protocol Proxy address and the Home Agent address to the mobile node at a step 560. With this information, the mobile node is able to communicate with its Home Agent and the SIP Proxy.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A system for dynamically configuring a Session Initiation Protocol (SIP) Proxy address for a mobile device, the system comprising:
   the mobile device that operates to send an authentication request and a bootstrap request to a gateway;
   the gateway that operates to send the authentication request to an authentication provider, to receive a Home Agent address and the SIP Proxy address from the authentication provider, and to send the Home Agent address and the SIP Proxy address to the mobile device in response to the bootstrap request; and
   the authentication provider that operates to authenticate the mobile device, to obtain the Home Agent address associated with a Home Agent chosen to be used by the mobile device, to obtain the SIP Proxy address from a preconfigured list of SIP Proxy servers that have been statically assigned to Home Agents, wherein the SIP proxy address represents a SIP proxy server previously assigned to the chosen Home Agent, wherein the list of SIP Proxy servers associated with Home Agent addresses is further associated with one or more communication paths in a network, wherein the list of SIP Proxy servers is preconfigured to represent the most efficient communication path within the network between each Home Agent and an associated SIP proxy server based on a location of the associated SIP Proxy server with respect to the Home Agent, and to send the Home Agent address and the SIP Proxy address to the gateway.

2. The system of claim 1, further comprising the mobile device that operates to communicate with the Home Agent associated with the Home Agent address, by means of the Session Initiation Protocol Proxy address, to establish a communication session.

3. The system of claim 1, wherein the authentication provider is an Authentication, Authorization and Accounting server.

4. The system of claim 1, wherein the gateway is a Packet Data Serving Node.

5. A method for enabling a mobile device to communicate across one or more networks, the method comprising:
   authenticating the mobile device to a network;
   receiving a Home Agent address of a Home Agent for the mobile device;
   obtaining a Session Initiation Protocol (SIP) Proxy address of a SIP Proxy for the mobile device, wherein obtaining the SIP Proxy address includes obtaining the SIP Proxy address by an authentication system, wherein obtaining the SIP Proxy address includes obtaining the SIP Proxy address from a list of SIP Proxy addresses associated with Home Agent addresses, wherein the list of SIP Proxy addresses associated with Home Agent addresses is preconfigured to represent the most efficient communication path between each Home Agent and an assigned SIP proxy based on a proximity of the assigned SIP Proxy to the Home Agent; and sending the Home Agent address and (SIP) Proxy SIP Proxy address to the mobile device, whereby the mobile device communicates with the Home Agent to establish a session.

6. The method of claim 5, wherein the authentication system comprises an authentication client and an authentication server.

7. The method of claim 6, wherein the authentication server is an Authentication, Authorization and Accounting server.

8. A computing device, containing a processor coupled to a memory, for operating a method for bootstrapping a Session Initiation Protocol (SIP) Proxy address to a mobile node, comprising:

receiving authentication credentials for the mobile node from an Internet Protocol gateway;

validating the authentication credentials;

obtaining a Home Agent address for the mobile node;

obtaining the SIP Proxy address for the mobile node, wherein obtaining the SIP Proxy address for the mobile node comprises retrieving the SIP Proxy address from a preconfigured list of SIP Proxy servers assigned to Home Agents, wherein the SIP Proxy address represents a SIP Proxy server having an optimal communication path in a network with the Home Agent, and wherein the optimal communication path is based on at least a proximity of the SIP Proxy server to the Home Agent or an efficiency of the optimal communication path within the network; and sending the SIP Proxy address and the Home Agent address to the Internet Protocol gateway, whereby the Internet Protocol gateway sends the SIP Proxy address and the Home Agent address to the mobile node upon receipt of a bootstrap request from the mobile node.

9. The computing device of claim 8, further comprising establishing a communication session between the mobile node and the Home Agent with the Home Agent address.

10. The computing device of claim 8, wherein the computing device is an Authentication, Authorization and Accounting server.

11. The computing device of claim 8, wherein the Internet Protocol gateway comprises a Packet Data Serving Node.

12. The computing device of claim 8, wherein the mobile node is authenticated to one of a home network or a foreign network.

* * * * *